Nov. 27, 1951
L. J. COLLINS
2,576,575
MACHINE FOR MIXING AND KNEADING
FOOD PRODUCTS AND THE LIKE
Filed April 7, 1947
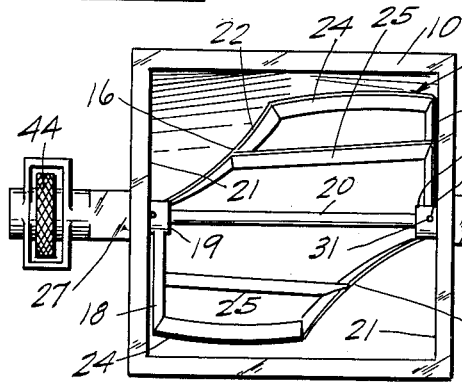
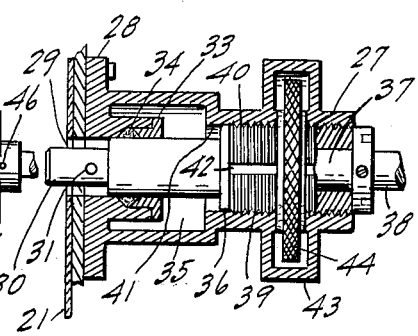
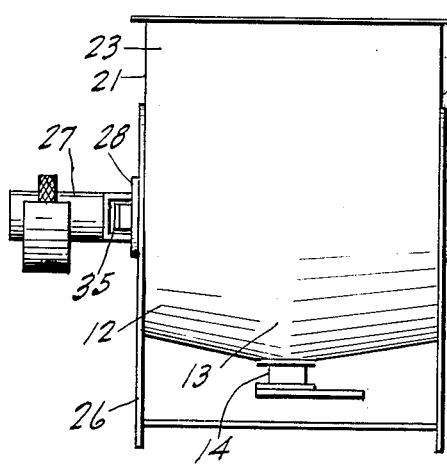
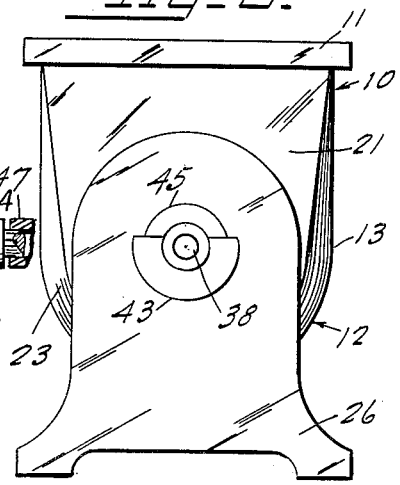
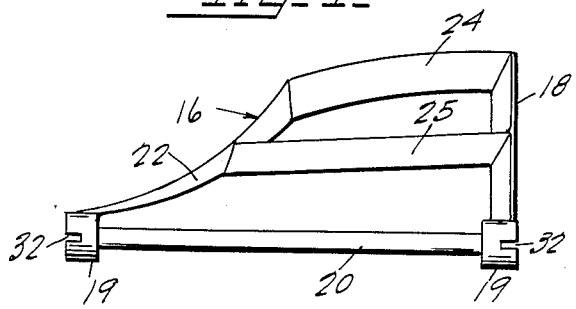
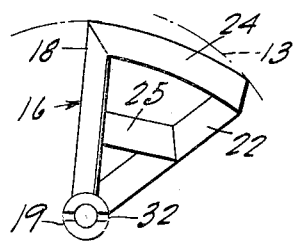
Inventor
Lowell J. Collins
By Philip C. Friedell
Attorney Patented Nov. 27, 1951

2,576,575

UNITED STATES PATENT OFFICE 2,576,575

MACHINE FOR MIXING AND KNEADING FOOD PRODUCTS AND THE LIKE

Lowell J. Collins, Oakland, Calif.

Application April 7, 1947, Serial No. 739,884

4 Claims. (Cl. 259—109)

1

This invention relates to improvements in mixing machines, and though particularly designed for mixing relatively soft or liquid foods is also adaptable for kneading doughs and for mixing substances other than food materials.

Conventional food mixers of the type which are operated by agitators which rotate about a horizontal axis are usually difficult or inconvenient to clean; the agitator or kneading element is usually irremovable or at least difficultly removable; and packing used for sealing the agitator shaft is not removable at will, or difficultly removable so that the machine is intermittently operated without the packing being cleaned and sterilized; and the agitator is usually so formed as to not cause the most efficient and thorough mixing or kneading of the product. Furthermore, so far as known all are made with a straight bottom container so that semi-liquid and liquid foods or other materials do not drain thoroughly or at least drain very slowly, and none have an agitator which is greater in diameter at the center than at the ends.

Applicant's invention overcomes the above mentioned disadvantages and provides a mixer which concludes an operation in a minimum of time at the same relative speed of operation because of the specific form of agitator and container; one which is easily and quickly assembled and disassembled to permit thorough cleaning and sterilizing including the packing for the shaft, and one which will quickly and thoroughly drain liquid and semi-liquid products.

The objects and advantages of the invention are as follows:

First, to provide a food mixer of the horizontal agitator type which is easily assembled and disassembled at will with all food-contacting parts easily accessible for cleaning and sterilization.

Second, to provide a food mixer as outlined with a container having a central diameter greater than that of the ends and to provide an agitator having peripheral blades which respectively operate in close relation to the respective center to end portions and with such blades outer ends in advance of the center ends and with the center ends relatively depressed to gather the product toward the center of the container.

Third, to provide a food mixer as outlined with special shaft retracting mechanism for releasing the agitator and manually operable at will.

Fourth, to provide packing and packing glands for the retractable shafts and provide for retraction of such packing and packing glands at will for cleaning and sterilization.

In describing the invention reference will be made to the accompanying drawings in which:

Fig. 1 is a top plan view of the invention.

Fig. 2 is a front elevation of Fig. 1.

Fig. 3 is a side elevation of Fig. 2 with the container cover applied.

Fig. 4 is an enlarged front elevation of one of the agitator sections.

Fig. 5 is a side elevation of Fig. 4.

Fig. 6 is an enlarged sectional plan view through the retractable shaft and bearing, showing the drive shaft end.

The invention includes a container 10 supplied with a cover 11 and having a semi-circular bottom 12 which tapers from both ends to the center to a greater diameter as indicated at 13 and being substantially equal in diameter to the upper end of the container, thus providing a sloping bottom to the discharge spout 14 while simultaneously providing for radial movement of the food material combined with lifting and depressing motion and gathering toward the center of the container. This multiple action results in exceptional efficiency with consequent more rapid and thorough mixing or kneading of materials.

The agitator 15 is made to cooperate with this specific type of container and to produce the motions and actions previously mentioned, and consists of a pair or pairs of opposed agitator sections 16 and 17 which are similarly formed but oppositely mounted to cooperate with the respective central to end portions of the walls of the container, each section comprising a radial straight arm 18 mounted on one hub 19 of a preferably tubular shaft 20 and disposed diagonally to the end wall 21 of the container to provide a cutting action close to the wall, and a second arm 22 extending from the other hub 19 to the enlarged center portion 13 of the body wall 23 and in follow relation to the arm 18 with the arm 18 extending substantially to the end portion of the body wall.

Agitator blades 24 and 25 span the arms, the blade 24 spanning the very ends of the arms and being diagonally disposed to the walls so as to provide a cutting or scraping action close to the wall from the end to the enlarged center at 13.

This combination of container tapered both ways from the center to the ends, and the agitator with its blades conforming to the taper and with the inner end of the blade in follow relation to the outer end causes the material to be lifted, drawn inward from the body wall and simultaneously transfer to the center of the container, providing an unusual, thorough, and efficient mixing or kneading of the product, and the enlarged center of the container further adds to the complicated movement of the material and consequently increases the efficiency and increases the space for collection of the material at the center, particularly desirable in connection with kneading operations.

The container is supplied with a suitable support 26 or other mounting or supporting means.

The container is provided with a releasable coupling and support at each end for supporting the agitator shaft, the two couplings being identical except as to the threaded bearings which are respectively right and left hand, with one provided with a shaft extension for driving the agitator.

Each coupling consists of a housing 27 having a flange 28 for securing the housing to the container and including a passage 29 for the retractable shaft 30 and which is provided with a key 31 to cooperate with a diametric slot 32 formed in the end of the hub 19, the shaft being slidable into the hub and forming a support for the agitator.

This shaft is provided with a packing gland 33 and packing ring 34, the housing having an opening 35 sufficiently large to permit convenient retraction of the packing gland and packing ring for cleaning and sterilization, and including sufficient retractability to permit complete removal.

The shaft 30 has a thrust collar 36 and thence is reduced in diameter as shown at 37, and one of the shafts has an extension 38 for connection to a power drive.

Rotatably mounted on this reduced portion is a bearing 39 which is externally threaded as indicated at 40 and slidable in a bore 41 in the housing, and a keyway 42 is formed throughout the length of this bearing.

A slot is formed in the housing and surrounded by a trough-like enlargement 43 and which forms the connection between the two ends of the housing, and a nut 44 has bearing on the respective walls of the slot as shown and is internally threaded to fit the threads on the bearing and is of sufficient outside diameter to extend above the top of the housing 43 as indicated at 45 in Fig. 2 to permit convenient manual adjustment of the nut, and a key 46 operates in the keyway 42 to maintain the bearing against rotation.

The illustrations show the unit ready for operation with the agitator mounted in place. After an operation is completed, the retractors 45 are manually adjusted to retract the ends of the shafts from the hubs 19, releasing the agitator for removal, cleaning and sterilization. The packing glands and packing rings are then retracted and cleaned or sterilized, or the shaft is retracted sufficiently to permit complete removal if desired, a slip coupling 47 permitting any desired degree of retraction.

Thus a unit is provided which is completely disassemblable and in which all parts which come in contact with the material are readily made accessible for cleaning and sterilization providing a thoroughly sanitary unit. The respective right and left hand threads on the bearings prevent accidental retraction of either bearing and shaft through reversible thrust action on the adjusting wheels.

I claim:

1. In a machine for mixing or kneading food products, and including a container and an agitator having a shaft; coupling and supporting means comprising a hub for each end of said shaft and having each an axial bore and a diametric slot formed therein; a housing for each end of the container and attachable to the exterior thereof and having a first bearing at the inner end and having an axial bore at the other end, and a second bearing exteriorly threaded to slidably fit in said axial bore and keyed to said housing against rotative movement only, and a nut threadedly cooperating with said second bearing, and an opening formed through the side of said housing and having end shoulders; said nut peripherally projecting through said opening, with said shoulders retaining said nut against axial movement relative to said housing, a support shaft rotatably fitting in said bearings and axially non-movable in said second bearing, with one end slidable in the axial bore in said hub and having a diametric key to fit in said diametric slot, whereby said support shaft is retractable at will through manual rotation of said nut to release the agitator shaft for removal of the agitator from the container.

2. A structure as defined in claim 1; said housing having an access opening formed through one side thereof between said first and second bearings; a packing gland for said first bearing and accessible for removal for cleaning through said access opening at will for complete sanitization of the bearing at will.

3. In a bread mixer having an agitator shaft having a hub at each end having an axial bore and a diametric slot; support means for the agitator shaft comprising a housing attachable to the end wall of the mixer and having a bearing at each end and an access opening therebetween with the first bearing at the inner end including a packing gland accessible for removal for cleaning at will through said access opening, and with the second bearing at the other end externally threaded and slidably fitting in a bore formed axially in said housing and having a keyway externally extending throughout its length and having an axial bearing bore, a nut threaded on said second bearing and peripherally projecting through an opening formed through the wall of said housing and maintained between the end walls of the opening against axial movement; a key in said housing and operating in said keyway for maintaining said second bearing against rotative movement, and a support shaft having one end insertible in said axial bore in said hub and having a diametric key to fit said diametric slot, and with the other end rotatable in said first and second bearings, and including shoulders on said shaft for maintaining said shaft against axial movement within said second bearing, whereby manual rotation of said nut axially adjusts said second bearing for axial adjustment of said support shaft for release or engagement of the agitator shaft at will to free the agitator for removal at will.

4. Coupling means for an agitator shaft comprising; a hub integral with each end of the agitator shaft and each hub having an axial bore and a diametric keyway formed inwardly from the outer end; centering, engaging, and supporting means comprising a supporting shaft for each end of said agitator shaft and having each a diametric key for engaging in said diametric keyway; a housing for each supporting shaft and having an opening formed through one side and having thrust walls, said housing having a bearing formed at one end and an axial bore formed at the other end; an externally threaded member having said supporting shaft rotatable therein and non-movable axially; said threaded member being axially movable in said axial bore in said housing and keyed against rotation therein, and an adjusting wheel internally threaded for threaded cooperation with said externally threaded member and maintained against axial movement between said thrust walls, with a portion projecting through said opening for accessibility for adjustment, for axial adjustment of the threaded member with the shaft for coupling the shaft to or uncoupling from the agitator shaft.

LOWELL J. COLLINS.

REFERENCES CITED

The following references are of record in the file of this patent:

UNITED STATES PATENTS

| Number | Name | Date |
|---|---|---|
| 1,129,329 | Blanchard | Feb. 23, 1915 |
| 1,434,617 | Lauterbur | Nov. 7, 1922 |
| 1,457,622 | Eliopulos | June 5, 1923 |
| 1,699,916 | Platin | Jan. 22, 1929 |
| 1,751,139 | Feinstein | Mar. 18, 1930 |
| 2,017,116 | Bonnell | Oct. 15, 1935 |
| 2,096,597 | Seabrooks | Oct. 19, 1937 |
| 2,351,361 | Ockrant | June 13, 1944 |

FOREIGN PATENTS

| Number | Country | Date |
|---|---|---|
| 432,765 | France | Dec. 15, 1911 |
| 128,177 | Germany | Feb. 11, 1902 |